Figure 1:
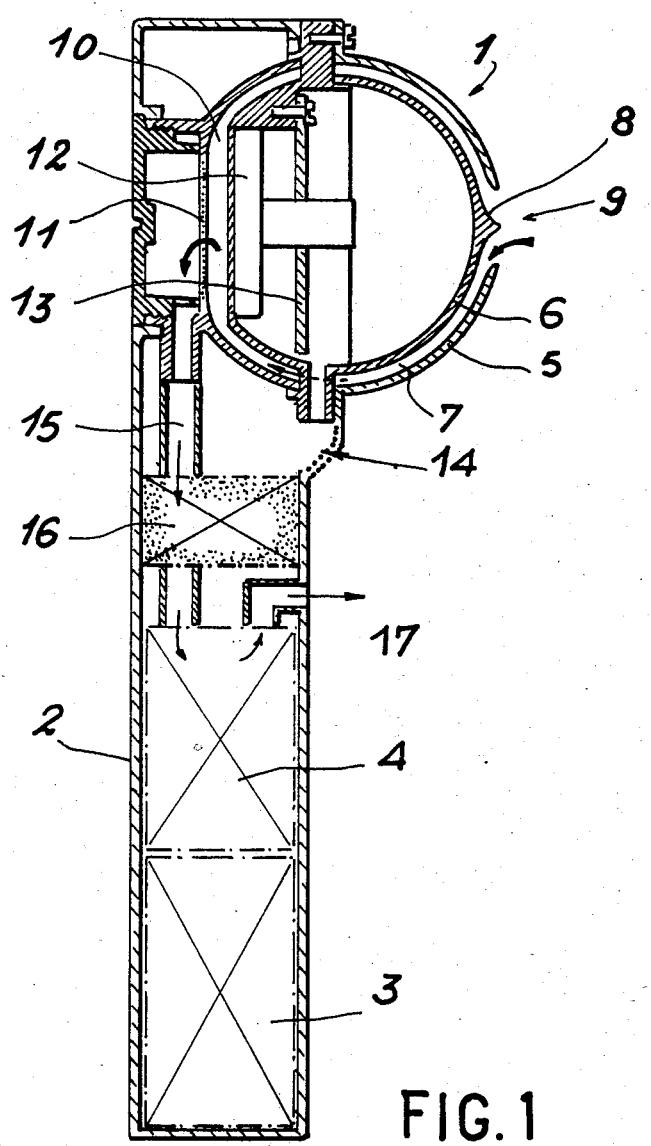

United States Patent [19]

Burghoffer et al.

[11] Patent Number: 4,607,165
[45] Date of Patent: Aug. 19, 1986

[54] PROCESS AND APPARATUS FOR DETECTING ATMOSPHERIC CONTAMINATION BY ALPHA PARTICLE AEROSOLS

[75] Inventors: Patrick Burghoffer, Lognes; Jean Charuau, Orsay; Marc Merelli, Gif sur Yvette; Raymond Prigent, Marcoussis, all of France

[73] Assignee: Commissariat A L'Energie Atomique, Paris, France

[21] Appl. No.: 618,580

[22] Filed: Jun. 8, 1984

[30] Foreign Application Priority Data

Jun. 10, 1983 [FR] France ................ 83 09685

[51] Int. Cl.[4] .............................................. G01T 1/16
[52] U.S. Cl. .................................. 250/435; 250/380; 250/370
[58] Field of Search .............. 250/370 A, 336.1, 380, 250/255, 437, 435, 438

[56] References Cited

U.S. PATENT DOCUMENTS 4,055,762 10/1977 Durkin .............................. 250/253
4,132,894 1/1979 Yule ................................... 250/435
4,277,682 7/1981 Madelaine et al. ................ 250/380

FOREIGN PATENT DOCUMENTS 0079079 5/1983 European Pat. Off. .
2456331 12/1980 France ............................ 250/435

OTHER PUBLICATIONS

IEEE Transactions on Nuclear Science, vol. NS-23, No. 3, Jun. 1976, New York (US) H. F. Schulte: "Current Technology in Sampling for Airborne Radionuclides", pp. 1197–1201 * en entier *.

Primary Examiner—Carolyn E. Fields
Attorney, Agent, or Firm—Pearne, Gordon, Sessions, McCoy, Granger & Tilberry

[57] ABSTRACT

Process for the detection of atmospheric contamination by alpha particle aerosols eliminating the background noise due to radon daughter nuclei, of the type consisting of collecting, by circulation of the atmospheric air, the alpha particles to be detected on a filter placed in front of a detection and counting system, wherein there is discrimination between the alpha particles present in the atmosphere coming from a polluting source and which it is wished to detect and count and the alpha particles constituting the background noise and which are normally present in the atmosphere, on the basis of their different grain sizes. The invention also relates to a portable detector for performing the aforementioned process. Application to monitoring the ambient air of laboratories, etc.

2 Claims, 2 Drawing Figures

PROCESS AND APPARATUS FOR DETECTING ATMOSPHERIC CONTAMINATION BY ALPHA PARTICLE AEROSOLS

BACKGROUND OF THE INVENTION

The present invention relates to the field of the detection of alpha particle aerosols contained in the atmosphere and particularly to the monitoring of laboratories in which work personnel handle plutonium or transuranium elements which emit alpha radiation.

In general terms, it is well known that the measurement of atmospheric contamination by alpha particle aerosols always comes up against the problem of ambient background noise due to the presence of radon and its daughter nuclei, which are normally present in the atmosphere and also alpha emitters. Thus, on collecting for analysis purposes all the alpha emitting particles, a falsified result is obtained, which does not give a correct picture of the dangers actually met with by a person breathing in the analysed atmosphere. Thus, whereas alpha particles due to radon and its daughter nuclei in the neutral atmosphere are normally inhaled by the human being without serious physiological consequences, plutonium 239 and its transuranium elements are highly toxic materials havng a very long decap period, i.e. by definition very dangerous when inhaled and fixed on organs of the human body.

It is for this reason that up to now an attempt has been made to separate in alpha contamination signals, those which are due to the background noise of radon daughter nuclei and those due to accidental chemical pollution. Two methods have hitherto been used, but they suffer from disadvantages making them very difficult to use.

The first of these methods consists of using alpha spectrometry, i.e. sorting the alpha particles as a function of their wavelength. This requires relatively heavy, expensive equipment and the physical and electronic processing required lasts a time which, in an emergency, could constitute an unacceptable delay.

The second method consists of carrying out this separation by studying the radioactive decay times of the different alpha particles, which permits a good separation of those emitted by radon daughter nuclei, but the analysis of the results takes a long time and involves a delay of about a day, which is prohibitive when it is wished to carry out rapid, continuous monitoring in a laboratory of the quality of the air inhaled by personnel.

Finally, the two aforementioned methods require the use of relatively complex, costly electronic equipment, which makes it completely impossible to produce a detection apparatus, which is autonomous and can be worn or carried by each person working in the laboratory.

SUMMARY OF THE INVENTION

The object of the present invention is a process for the detection of atmospheric contamination by alpha particle aerosols, which makes it possible to obviate the aforementioned disadvantages and makes it possible to provide autonomous, portable detection apparatus by carrying out the separation of the background noise due to radon daughter nuclei by using means which are solely of a mechanical and static nature.

Therefore, the present invention relates to a detection process of the type consisting of collecting, by circulation of the atmospheric air, the alpha particles to be detected on a filter placed in front of a detection and counting system, wherein there is discrimination between the alpha particles present in the atmosphere coming from a polluting source and which it is wished to detect and count and the alpha particles constituting the background noise and which are normally present in the atmosphere, on the basis of their different grain sizes.

The effectiveness of the process according to the invention results from the following considerations relating to the grain sizes of alpha emitting particles. In the generally filtered atmosphere of a laboratory where transuranium elements are treated, experience has shown that the alpha emitting particles of such elements have a grain size between 1 and 10 microns and that in any case the larger particles are of no interest, because they are relatively difficultly inhalable and do not penetrate the organism. Alpha particles due to atmospheric background noise and to radon daughter nuclei consist of two fractions, whose grain sizes are well below the aforementioned limits and which have the following distribution:

the radon daughter nuclei which are free, i.e. not fixed to fine natural particles have an ultrafine grain size generally between $6.10^{-4}$ and $2.10^{-3}$ micrometer;

the other part of the same radon daughter nuclei is fixed to fine natural particles, whose average grain size is then generally between 0.1 and 0.2 micrometer;

The results of the above analysis show that it is possible to discriminate between the two types of alpha emitters present in the atmosphere, solely on the basis of grain size differences thereof. This has the important feature that this discrimination can be carried out by purely mechanical and static means, i.e. simple, reliable and inexpensive means, which can easily be incorporated into a small autonomous, portable apparatus.

More specifically, the atmospheric contamination detection process according to the invention comprises discrimination taking place in two parts, namely:

a first elimination of the free fraction of the radon daughter nucleus alpha particles by passing the atmospheric air to be monitored into a space defined by two parallel walls before it reaches the filter;

a second elimination of the fraction of the radon daughter nucleus alpha particles fixed to the fine neutral particles, by passing the atmospheric air through a filter having capillary pores, which permits the passage of particles with a grain size below 1 micron and up to approximately $5.10^{-2}$ micrometer.

Thus, according to the invention, between two parallel walls is trapped the free fraction of the radon daughter nuclei in accordance with the known physical effect of trapping by molecular diffusion. The characteristics (thickness, nature of the walls, air flow rate) of the trapping structure are sufficiently well known to the expert for three different parameters to be chosen so as to trap the free daughter nuclei of the radon, whose ultrafine grain size is known.

The fine natural particles supporting the alpha emitting radon daughter nuclei are eliminated by choosing the dimensions of the pores of the microporous filter in which are consequently collected the particles to be detected and measured, whose grain size is between 1 and 10 micrometers.

Also, according to the invention, the suction flow rate and the parameters of the suction circuit (shape, size, etc) are chosen in such a way that the particles to be measured cannot be held back before the filter. In other words, knowing the molecular diffusion properties, the expert will choose the parameters of the suction circuit so as to prevent any sedimentation of the useful particles under the effect of gravity, whilst also preventing inertial impacting under the action of centrifugal force or deposits, which could result from turbulence occurring in the flow.

Although grain size analysis of the alpha particle aerosols present (those which it was desired to measure, because they are dangerous and the non-dangerous parasitic radon daughter nuclei) led to the choice of a physical discrimination method between these two categories using the grain size criterion, it was not obvious that purely physical processes would permit such a separation without losing useful particles to be measured prior to their arrival at the filter. Following detailed research, the present inventors have found that the combination of the two aforementioned parasitic aerosol elimination processes was compatible and have been able to demonstrate, at the diffusion space, that it was possible to satisfy the flow requirements without loss of particles to be measured, whilst bringing about a trapping of the ultrafine parasitic particles at the inlet to the system. Moreover, it is pointed out that the combination of the two means used for the elimination is absolutely indispensable, because the microporous filter along is not able to eliminate the free fraction of the radon daughter nuclei whilst only retaining the useful particles to be measured. Thus, the pores of such a filter would trap, by diffusion, the ultrafine particles with a collection efficiency of approximately 80% for a grain size of $10^{-2}$ micrometer and approximately 100% on reaching $10^{-3}$ micrometer. This confirms the non-obvious character of the result obtained and the need of using the two associated means in combination in order to obtain this physical elimination.

The invention also relates to a portable detector for detecting the atmospheric contamination by alpha particle aerosols and which utilizes the aforementioned particularly simple process.

Thus, the invention also relates to a portable detector, of the type incorporating in an autonomous box, a suction head for the atmospheric air to be monitored, means for circulating this air through a microporous filter, an electronic system for detecting and counting the particles held back on the filter and an electrical power supply, wherein the suction head has a generally spherical shape, the suction of the atmospheric air and its passage towards the filter taking place in a space between two concentric spherical surfaces, the outer spherical surface being open along a suction orifice in which is located a deflecting part of the underlying inner sphere, whose tapered profile is chosen in order to minimize the loss of particles to be detected by inertial impacting on the walls, the capillary pore filter then traversed by the air flow to be monitored having a porosity chosen so as to only hold back the particles having a grain size larger than 1 micrometer.

Preferably, the detector is associated with a sound or other type of alarm, which notifies the wearer of an abnormal neighbouring radioactive contamination level.

Optimization calculations carried out on the detector according to the invention have shown that optimization of the portable apparatus would lead to a construction wherein the average diameter of the air gap between the two spheres is 50 mm, the thickness of the air gap 1.5 mm, the radius of curvature of the apex of the deflecting part of the inner sphere is 5 mm, the air suction flow rate 3 liters/minute and the distance between the filter and the sensitive detector surface approximately 3 mm.

BRIEF DESCRIPTION OF THE DRAWINGS

The invention is described in greater detail hereinafter relative to a non-limitative embodiment of a portable detector for detecting atmospheric contamination by alpha particle aerosols and with reference to the attached drawings, wherein show:

FIG. 1 in section, the general diagram of the apparatus.

FIG. 2 the discrimination curve of the particles, as a function of their grain size.

DETAILED DESCRIPTION OF THE INVENTION

The apparatus shown in FIG. 1 comprises in per se known manner a suction head 1 mounted on a box 2, which has an electric battery 3 and a minipump 4 for circulating the atmospheric air sampled from the room to be monitored. The random known type of minipump 4 and battery 3 are not shown in the drawing, in detail although they are schematically indicated.

According to the invention, the atmospheric air to be monitored is sucked in by means of a system of two concentric spheres 5, 6, which define between them an air circulation space 7. On the front face of the apparatus, the outer sphere 5 is terminated by a suction orifice 9 open to the outside and in which is located a deflecting part 8 terminating that part of inner sphere 6 in front of suction orifice 9. The air sampled through the latter moves under the effect of the vacuum produced by minipump 4 into the intermediate space 7 between spheres 5 and 6 and passes up to the lower chamber 10 to the rear of suction head 1.

On either side of lower chamber 10 are respectively provided a microporous filter 11 and a radiation detector 12 constituted, in the present embodiment, by a surface barrier diode. Behind detector 12 there is a per se known electronic circuit 13, which converts the pulses detected into electrical pulses having a frequency characteristic of the alpha radiation intensity detected, said frequency being retransmitted by a sound element 14 in the form of a variable frequency signal to the wearer of the apparatus. After passing through microporous filter 11, the trapped atmospheric air flows in pipe 15 through an absolute filter 16, which holds back all the dust or impurities, which are finally discharged to the outside at 17 in accordance with the path indicated by the arrows in the drawing.

As stated hereinbefore, the originality of the invention is based solely on the concept of suction head 1, which brings about the two successive eliminations of the alpha radiation sources from the radon daughter nuclei.

To this end, according to a particularly interesting embodiment of the portable detector according to the invention, the latter has been optimized so as to cause a minimum number of inconveniences for the wearer. It is with this aim in mind that the overall dimensions and weight of the apparatus and battery 3 (approximately 450 g) have been carefully calculated. In order to minimize electric power consumption and the noise of pump 4, the suction flow rate has deliberately been limited to an average value of 3 liters/minute which corresponds to a standard which is generally accepted in laboratories for such portable detectors.

The spherical assembly constituting suction head 1 has an external diameter of 55 mm. It is mounted on a parallelepipedic plastic box 2 and it is the latter which contains absolute filter 16 in order to protect the downstream minipump 4. The surface barrier diode has a diameter of substantially 24 mm.

The thickness of air gap 7 between spheres 5 and 6 is 1.5 mm. The radii of curvature of the tip of deflecting part 8 and the lower chamber 10 are respectively 5 and 13 mm. The average diameter of the air gap 7 is 50 mm and the distance between filter 11 and the sensitive surface of deflector 12 is 3 mm.

All the thus optimized characteristics make it possible to obtain, by purely mechanical and static means, a certain number of remarkable results and particularly the maximum reduction of the loss of large size particles on the walls, a relatively low inertia of the same large particles at the entrance to the apparatus, which prevents them impacting with the deflecting part 8. Moreover, in order to bring about minimum electrostatic precipitation of the charged particles on the walls of gap 7, these are metallic or metallized.

The ultrafine particles of the solid radon daughter nuclei not fixed to the natural fine particles are generally electrically positive or neutral. In view of their small size, these particles have a very considerable mobility and rapidly diffuse, which makes it possible to completely trap them in the walls of the air flow gap 7 of sampling head 1.

Finally, a simple means for separating the grain size spectrum and for rejecting the fine natural particles with average dimensions of 0.1 to $0.2\mu$, to which are fixed part of the solid radon daughter nuclei consists of using a capillary pore sampling filter 11, in order to only hold back on the filter the fraction of particles having a grain size exceeding 1 micron. Filter 11 is in fact a polycarbonate membrane with a thickness of 10 microns. Investigation of the collection effectiveness of filter 11, as a function of the aerodynamic diameter of the particles has revealed that the membrane has an optimum efficiency when the porosity is 3 microns.

The portable detector according to the invention, thus makes it possible to ensure the individual detection of the atmospheric contamination by alpha particles aerosols by sucking in, using a small pump 4, a flow of 3 liters per minute, the suction head 1 of the apparatus making it possible to:

trap aerosols up to 10 microns with an efficiency of approximately 100%;

trap on its walls the ultrafine particles (of $6.10^{-4}$ to $2.10^{-3}\mu$) constituting the free fraction of the radon daughter nuclei;

leading, without significant losses (less than 7%) the largest particles (10 microns) to the sampling filter 11, on which they are distributed in a homogeneous manner;

separate the submicron particles traversing the capillary pore membrane 11 from the large particles which are the only ones held back;

measure the alpha activity of these large particles with a semiconductor particle counter 12, whose sensitive surface, which is slightly larger than that of filter 11, is moved approximately 3 mm therefrom.

Study of the apparatus has shown that it permits an almost total elimination (98% of theory) of the free fraction of the solid radon daughter nuclei and approximately 88% of those fixed to the submicron particles. Under these conditions, the background noise due to the radon and the daughter nuclei normally present in the atmosphere decreases by a factor of approximately 10 to 20 compared with its level when the alpha activity is measured without precautions.

Figure 2:
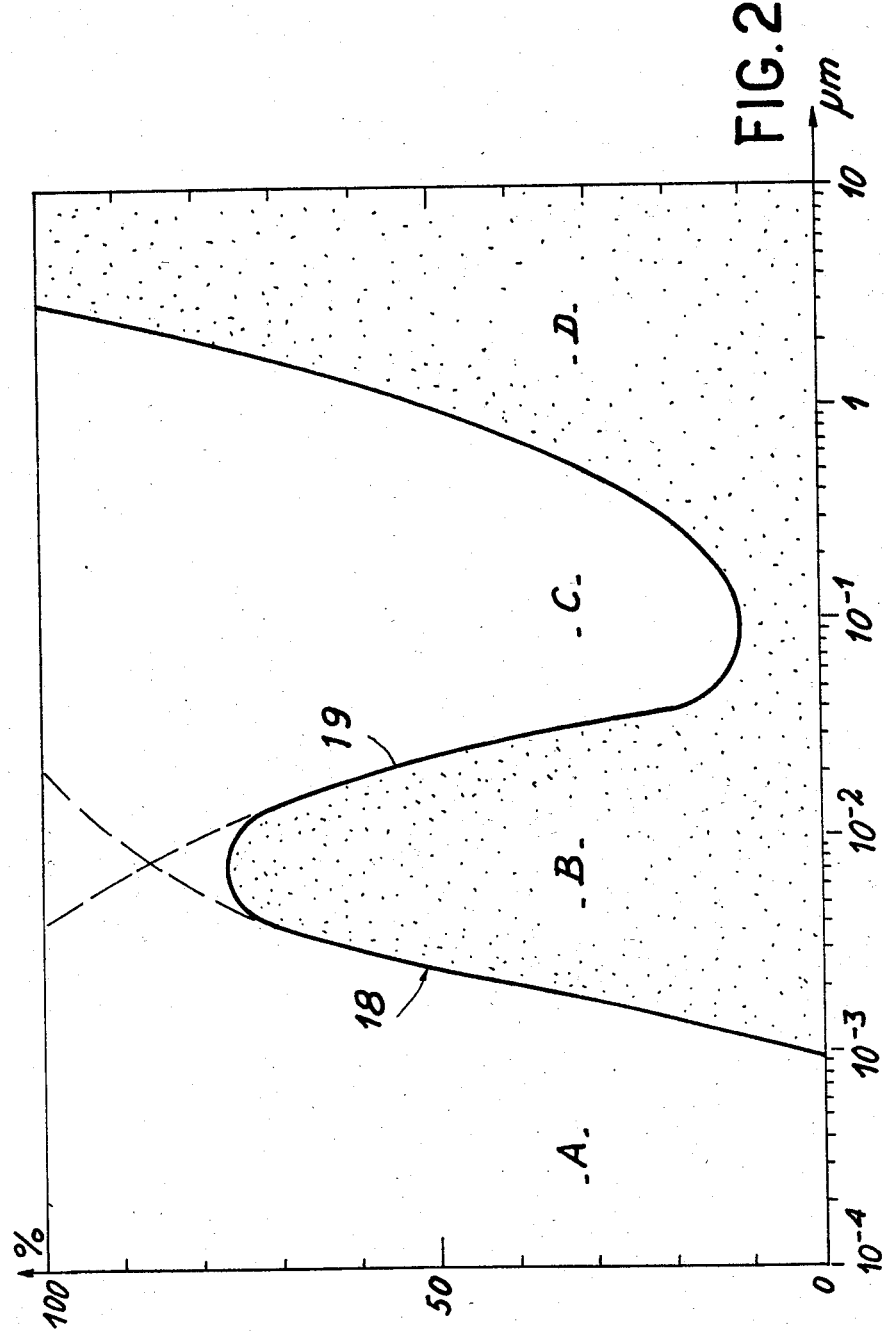

This is what is shown in the curve of FIG. 2, which shows the percentages of particles collected by filters 11, as a function of their diameter, or their equivalent aerodynamic diameter (density 1) for particles having a diameter larger than 1 micrometer, said diameter being expressed in micrometers.

In FIG. 2, it is possible to see curve 18 showing the trapping of the ultrafine particles by gap 7 and curve 19 showing the effect of filter 11.

Curves 18 and 19 define spaces A, B, C and D respectively corresponding for space A to ultrafine particles including the free radon fraction and trapped by gap 7;

space B particles of intermediate size, not carrying radon and partly collected by filter 11;

space C fine radon-carrying particles, which pass through filter 11;

space D, the particles to be measured and collected by filter 11.

Finally, the small size of the suction head 1 made from Duralinox (diameter 55 mm) and the relatively low weight of the prototype (450 g, including all accessories), make it possible to produce an individual, portable apparatus, which completely satisfies the requisite efficiency criterion.

What is claimed is:

1. A process for the detection of atmospheric contamination by alpha particle aerosols by eliminating the background noise due to radon daughter nuclei, consisting of the steps of collecting, by circulation of the atmospheric air, the alpha particles to be detected on a filter placed in front of a detection and counting system, wherein there is discrimination in said collecting between the alpha particles of a first grain size present in the atmosphere coming from a polluting source and which it is wished to detect and count, and the alpha particles of a second and third grain size constituting the background noise and which are normally present in the atmosphere, on the basis of their different grain sizes, wherein the discrimination is carried out in two stages, namely:

a first elimination of the free fraction of the radon daughter nucleus alpha particles of said second grain size by passing the atmospheric air to be monitored into a space defined by two parallel walls before it reaches the filter;

a second elimination of the fraction of the radon daughter nucleus alpha particles fixed to fine neutral particles of said third grain size, by passing the atmospheric air through a filter having capillary pores, which permits the passage of particles of said third grain size with a grain size below 1 micron and up to approximately $5.10^{-2}$ micrometer.

2. A portable detector for detecting the atmospheric contamination by alpha particle aerosols comprising in an autonomous box, a suction head for atmospheric air to be monitored, means for circulating this air through a microporous filter, an electronic means for detecting and counting the particles held back on the filter and an electrical power supply, the suction head having a generally spherical shape, the suction of the atmospheric air and its passage towards the filter taking place in a space between two concentric spherical surfaces, the outer spherical surface being open along a suction orifice in which is located a deflecting part of the underlying inner sphere, whose tapered profile is chosen in order to minimize the loss of particles to be detected by inertial impacting on the walls, the filter then traversed by the air flow to be monitored having a porosity chosen so as to only hold back the particles having a grain size larger than 1 micrometer, wherein an average diameter of the air gap between the two spheres is 50 mm and thickness of the air gap is 1.5 mm, the radius of curvature of the apex of the deflecting part of the inner sphere is 5 mm, the air suction flow rate is 3 liters/minute, and the distance between the filter and the sensitive detector surface is approximately 3 mm.

* * * * *